US009210031B1

United States Patent
Kirby (10) Patent No.: US 9,210,031 B1
(45) Date of Patent: Dec. 8, 2015

(54) BROKERING FOR APPLICATION HOSTING COMPUTING RESOURCES OF MULTIPLE VENDOR-SPECIFIC PROVISIONED COMPUTING ENVIRONMENTS

(75) Inventor: Christopher Paul Kirby, Lake Tapps, WA (US)

(73) Assignee: Amazon Technologies, Inc., Reno, NV (US)

(*) Notice: Subject to any disclaimer, the term of this patent is extended or adjusted under 35 U.S.C. 154(b) by 875 days.

(21) Appl. No.: 13/077,616

(22) Filed: Mar. 31, 2011

Related U.S. Application Data (60) Provisional application No. 61/421,487, filed on Dec. 9, 2010.

(51) Int. Cl.
| | | |
|---|---|---|
| *H04L 29/08* | (2006.01) | |
| *G06F 9/50* | (2006.01) | |
| *H04L 5/00* | (2006.01) | |
| *H04L 12/24* | (2006.01) | |
| *H04L 29/06* | (2006.01) | |
| *H04L 12/917* | (2013.01) | |
| *H04L 12/911* | (2013.01) | |

(52) U.S. Cl.
CPC ........ *H04L 29/08774* (2013.01); *G06F 9/5027* (2013.01); *H04L 41/0803* (2013.01); *H04L 5/0035* (2013.01); *H04L 12/2404* (2013.01); *H04L 12/2426* (2013.01); *H04L 29/0602* (2013.01); *H04L 41/022* (2013.01); *H04L 47/76* (2013.01); *H04L 47/78* (2013.01); *H04L 67/2838* (2013.01)

(58) Field of Classification Search
CPC .............................. G06F 9/5044; G06F 9/5055
USPC ........................................................... 709/226
See application file for complete search history.

(56) References Cited

U.S. PATENT DOCUMENTS

| | | | | |
|---|---|---|---|---|
| 6,112,243 | A * | 8/2000 | Downs et al. ................. | 709/226 |
| 8,494,515 | B1 * | 7/2013 | Elkady ........................ | 455/432.2 |
| 2003/0195921 | A1 * | 10/2003 | Becker et al. ................. | 709/200 |
| 2004/0098467 | A1 * | 5/2004 | Dewey et al. ................. | 709/219 |
| 2004/0193388 | A1 * | 9/2004 | Outhred et al. ................... | 703/1 |
| 2005/0021530 | A1 * | 1/2005 | Garg et al. ..................... | 707/100 |
| 2005/0055590 | A1 * | 3/2005 | Farkas et al. .................. | 713/320 |
| 2005/0251783 | A1 * | 11/2005 | Torone et al. ................. | 717/104 |
| 2005/0273779 | A1 * | 12/2005 | Cheng et al. .................. | 717/168 |
| 2006/0031248 | A1 * | 2/2006 | Vinberg et al. ........... | 707/103 R |
| 2010/0198972 | A1 * | 8/2010 | Umbehocker ................ | 709/226 |
| 2011/0016214 | A1 * | 1/2011 | Jackson ........................ | 709/226 |
| 2011/0022812 | A1 * | 1/2011 | van der Linden et al. .... | 711/163 |

* cited by examiner

*Primary Examiner* — Michael Y Won
(74) *Attorney, Agent, or Firm* — Baker Botts L.L.P.

(57) ABSTRACT

In certain embodiments, a computer-implemented method includes accessing, using one or more processing units, application parameters associated with an application. The application parameters define constraints for hosting the application using one or more of a plurality of provisioned computing environments available over a computer network from multiple computing resources vendors. Each vendor is associated with a corresponding vendor-specific provisioned computing environment that includes computing resources available to be provisioned for use by a multiple entities distinct from the vendors. The method includes accessing, using the one or more processing units, vendor-specific data for the vendor-specific provisioned computing environments. The method includes determining, using the one or more processing units, from among the vendor-specific provisioned computing environments and based on the application parameters and the vendor-specific data for the provisioned computing environments, a first vendor-specific provisioned computing environment for hosting the application.

24 Claims, 5 Drawing Sheets

BROKERING FOR APPLICATION HOSTING COMPUTING RESOURCES OF MULTIPLE VENDOR-SPECIFIC PROVISIONED COMPUTING ENVIRONMENTS

RELATED APPLICATIONS

This application claims the benefit under 35 U.S.C. §119(e) of the priority of U.S. Provisional Application Ser. No. 61/421,487, filed Dec. 9, 2010, entitled "Brokering for Application Hosting Computing Resources of Multiple Vendor-Specific Provisioned Computing Environments."

BACKGROUND

Owners of computer applications, including for example application developers, businesses or any other entities owning or otherwise providing an application, often desire that functionality provided by their application be made available over a computer network. In some cases, application owners may wish to provide their applications to users by using computing resources offered by a provisioned computing resources vendor associated with a provisioned computing environment. The computing resources vendor may provision computing resources of the vendor's associated provisioned computing environment for use, such as for application hosting, over a computer network.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

As described above, application owners or other suitable entities may desire hosting of their applications using computing resources offered by one or more computing resources vendors. The computing resources vendors may make computing resources, such as any suitable combination of hardware, firmware, and software resources, available over a computer network for a fee for use by entities external to the vendor. Each vendor may operate a provisioned computing environment that is unique in one or more respects relative to the provisioned computing environments of other vendors. For example, each vendor's provisioned computing environment may have associated pricing, capabilities, framework structure, performance, and other associated characteristics, any or all of which may be unique to that provisioned computing environment and may change over time. Additionally, even with a single computing resources vendor, different service levels and capabilities may be available for different fees.

It may be quite burdensome for application owners to review the pricing, capabilities, framework structure, performance, and other associated characteristics of the various vendors to determine the vendor-specific computing resources environment that best meets the application owner's needs at a particular time. It may be even more onerous for application owners to monitor changes in the pricing, capabilities, framework structure, performance, and other associated characteristics of the various vendors to determine whether the vendor-specific computing resources environment that best meets the application owner's needs has changed over time. Furthermore, changes in the application owner's objectives may also dictate that a reevaluation of the appropriate vendor-specific provisioned computing environment for hosting the owner's application should be performed. Thus, it would be burdensome for an application owner to frequently review their objectives and the characteristics of the various vendor-specific computing environments. However, failing to do so may cost the application owner both financially and with undesirable application performance.

Embodiments of the present disclosure provide a broker that is operable to determine from among a number of provisioned computing environments, two or more of which are associated with different vendors, one or more provisioned computing environments that are best suited for hosting an application according to various constraints specified by the application owner and information about the various provisioned computing environments. In other words, from the available provisioned computing environment from a variety of vendors, the broker may determine the one or more most appropriate provisioned computing environment to host the application owner's application according to various constraints identified by the application owner and information about the provisioned computing environments.

The broker may be able to make this determination dynamically, such that as the constraints identified by the application owner change and/or certain variables associated with the various vendor-specific provisioned computing environments change, the running application (e.g., in one of the plurality of provisioned computing environments) may be dynamically moved to a more appropriate one or more vendor-specific provisioned computing environments according to this changed information. In making this determination, the broker may consider various data about the vendor-specific provisioned computing environments. The data may include performance data, cost data, and any other suitable data about the vendor-specific computing environments. The broker may initiate hosting using the determined one or more provisioned computing environments of the application. In certain embodiments, the operation of the broker and the associated moves of hosting of the application may be substantially transparent to uses of the application.

Figure 1:
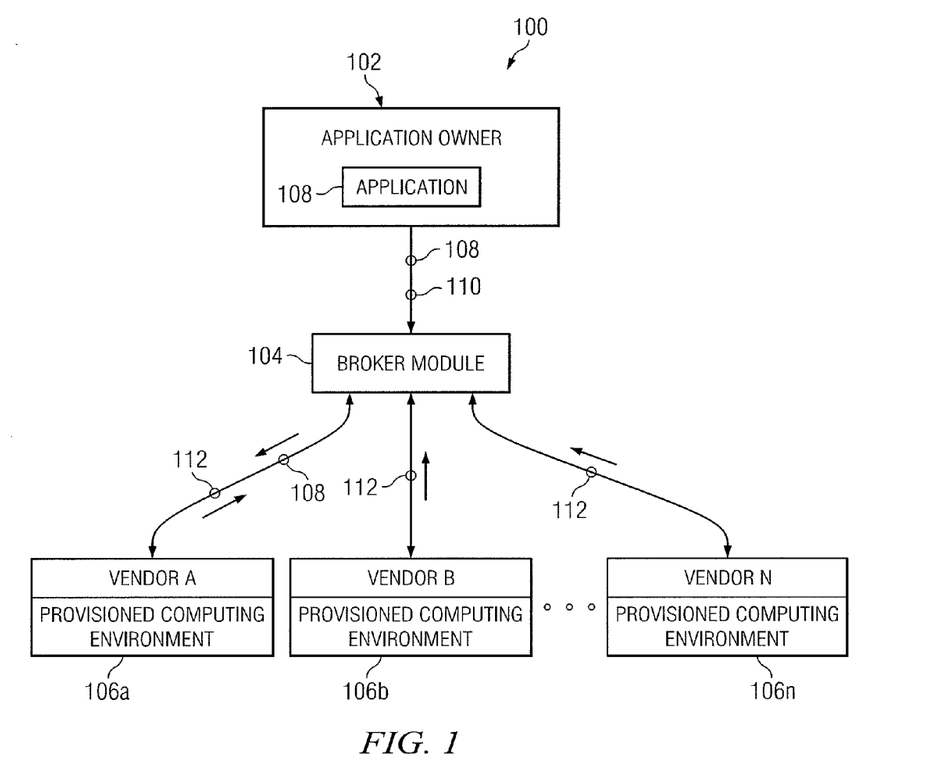
FIG. 1 illustrates an example system that is operable to broker for application hosting computing resources of multiple vendor-specific provisioned computing environments, according to certain embodiments of the present disclosure.

FIG. 1 illustrates an example system 100 operable to broker for application hosting computing resources of multiple vendor-specific provisioned computing environments, according to certain embodiments of the present disclosure.

In the illustrated example, system 100 includes a client system 102, a broker module 104, and a plurality of vendor-specific provisioned computing environments 106. Although system 100 is illustrated and primarily described as including particular components, the present disclosure contemplates system 100 including any suitable components, according to particular needs.

In general, broker module 104 is operable to broker for hosting of an application associated with client system 102 computing resources of the plurality of vendor-specific provisioned computing environments 106. For example, broker module 104 accesses application parameters provided by an application owner (e.g., via client system 102) and vendor-specific data received regarding vendor-specific provisioned computing environments 106 (e.g., via vendor-specific provisioned computing environments 106) and considers that accessed information and data in determining which one or more vendor-specific provisioned computing environments 106 should host the application. Broker module 104 may substantially continuously or at any other suitable regular or irregular interval re-determine the appropriate vendor-specific provisioned computing environment 106 that should host the application.

Client system 102 may be implemented using any suitable type of processing system and may include any suitable combination of hardware, firmware, and software. Client system 102 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device. Client system 102 may be a stand-alone computer or may be a part of a larger network of computers associated with an entity.

Client system 102 may be operated by or otherwise used by an owner of an application 108. An application owner may be an entity such as an individual or business (or any other suitable group of individuals) that owns the rights to use an application. However, it should be understood that reference to application owner may include any other suitable entity seeking to have an application hosted using computing resources of provisioned computing environments provided by vendors. The application owner may use client system 102 to submit applications 108 to be hosted, application parameters 110 associated with those applications 108, and other suitable input to broker module 104.

Application 108 may include any suitable combination of software, firmware, and hardware that is operable to provide functionality to users of application 108. As just one example, application 108 may include a web site and/or web service to be hosted using computing resources of one or more provisioned computing environments 106. Application parameters 110 may define constraints for hosting application 108 using one or more vendor-specific provisioned computing environments 106. An application owner may use client system 102 to submit application 108 and associated application parameters 110 to broker module 104 for broker module 104 to determine which vendor-specific provisioned computing environments 106 will host application 108 at any given time in a manner that best meets constraints (e.g., application parameters) identified by the application owner and is most cost effective (assuming the constraints include such a request).

Broker module 104 may include any suitable type of processing system and may be implemented using any suitable combination of hardware, firmware, and software. Additional details regarding example techniques for implementing broker module 104 are described below with reference to the example system 200 of FIG. 2 and the example broker module 104 of FIG. 3.

Broker module 104 is generally operated by an entity that is distinct from at least one or more of the vendors providing provisioned computing environments 106. However, it should be understood that the entity operating broker module 104 also may be a vendor that provides one or more of provisioned computing environments 106. Additionally, the entity operating broker module 104 may or may not be distinct from the application owner.

In general, broker module 104 is operable to broker for application hosting computing resources of multiple vendor-specific provisioned computing environments 106. Broker 104 may make its brokering determinations based on application parameters 110 (described in greater detail below), vendor-specific data 112 (described in greater detail below), and any other suitable information. As will be described in greater detail below with reference to FIG. 3, broker module 104 may provide a portal and/or application programming interface (API) to client system 102 through which the application owner may submit applications 108 and associated application parameters 110.

Turning to vendor-specific provisioned computing environments 106, system 100 includes a number of vendor-specific provisioned computing environments 106. Each provisioned computing environment 106 may including various computing resources and may provide an environment in which one or more of the computing resources are made available over a communication network to one or more remote computer systems (e.g., client system 102 or other systems). In certain embodiments, a portion or all of the components of each provisioned computing environment 106 form a computing infrastructure which may be communicatively coupled together over a high speed communication network. Each vendor-specific provisioned computing environment 106 may provide a collection of remote computing services offered over a network. Those computing services may include, for example, storage, processors, applications, or any other suitable computing resources that may be made available over a communication network. In certain embodiments, entities accessing those computing services may gain access to a suite of elastic information technology (IT) infrastructure services (e.g., computing resources) as the entity requests those services. Provisioned computing environments 106 may provide a scalable, reliable, and secure distributed computing infrastructure.

At least certain of the vendor-specific provisioned computing environments 106 are provided by distinct vendors. In the illustrated example, provisioned computing environment 106a is provided by vendor A, provisioned computing environment 106b is provided by vendor B, and so on. A vendor may include any suitable entity that operates or otherwise manages one or more provisioned computing environments 106 for provisioning of computing resources to one or more other entities over a computer network. Each vendor typically provides a framework for operating or otherwise managing its associated one or more provisioned computing environments 106 that may be different in one or more respects from the framework used by other vendors associated with other provisioned computing environments 106. Additionally, each vendor may have its own capabilities. Moreover, each vendor typically has its own cost structure for pricing the provision of its associated computing resources to other entities. Additionally, at any given time, each vendor's associated provisioned computing environments 106 may experience different operating conditions, which may affect performance of the provisioned computing environments 106. Thus, each vendor-specific provisioned computing environment 106 may have associated pricing, capabilities, framework structure, performance, and other associated characteristics, any or all of which may be unique to that computing environment and may change over time.

Although each vendor-specific provisioned computing environment 106 is illustrated and primarily described as being associated with a different vendor, the present disclosure contemplates a single vendor offering multiple provisioned computing environments 106 having any suitable combination of different pricing, capabilities, framework structure, performance, and other associated characteristics. Thus, broker module 104 may be used to broker a single vendor's multiple provisioned computing environments 106, either alone or in combination with other vendors' provisioned computing environments 106. In certain embodiments, the entity providing broker module 104 may also be a vendor of one or more vendor-specific provisioned computing environments 106.

As described briefly above, in brokering vendor-specific provisioned computing environments 106 for hosting of application 108, broker module 104 may at one or more times gather and consider vendor-specific data 112. Vendor-specific data 112 may include any suitable information relating to one or more characteristics of vendor-specific provisioned computing environments 106. Broker module 104 may gather vendor-specific data 112 for each of the various vendor-specific provisioned computing environments 106. For example, vendor-specific data 112 may include values for one or more of the following characteristics of vendor-specific provisioned computing environments 106: pricing; capabilities; framework structure; performance; and other characteristics of the various vendor-specific provisioned computing environments 106.

As more particular examples, vendor-specific data 112 may include values for one or more of the following characteristics of vendor-specific provisioned computing environments 106: central processing units (e.g., clock speed and number of cores); volatile memory (e.g., size); non-volatile memory (e.g., size); physical location of computing resources (e.g., geographic location, such as city, state, country); availability (e.g., availability to host an application and to what extent); security (e.g., types of security formats, processes, and systems used by environment 106); hosting costs (e.g., the current pricing information to the application for using environment 106 for hosting application 108); vendor identity (e.g., the name of the vendor); and any other suitable characteristics. In certain embodiments, vendor-specific data 112 may be gathered generally for both available (but currently unused for purposes of hosting application 108) provisioned computing environments 106 and those one or more provisioned computing environments 106 that currently host application 108 (if any).

Vendor-specific data 112 may be gathered by broker module 104 in any suitable manner. For example, broker module may poll at any suitable regular or irregular interval computing environments 106 for appropriate vendor-specific data 112. As another example, provisioned computing environments 106 may be configured to communicate vendor-specific data 112 to broker module 108 at one or more regular or irregular intervals. As yet another example, an authorized user may manually input vendor-specific data into broker module 104.

Different application owners may have different objectives for hosting of applications. For example, an application owner may expect its application 108 to be hosted in a manner that achieves the greatest available performance regardless of cost. This may be the case for an application 108 that is critical for the business of the application owner. However, even under such constraints, broker module 104 may be able to determine the lowest cost vendor that still provides the best performance (e.g., should two or more vendors be able to provide the "best" performance but at different prices). As another example, an application owner may expect certain performance and availability minimums, but may also request balancing of those constraints against certain cost constraints. One particular example scenario that may be requested by an application owner may be referred to as the "chase-the-sun" approach, which may take advantage of instances when computing resources are cheaper at night (when demand is typically lower) than during the day. In this scenario the application owner may be tolerant of some network latency for application 108 since the application 108 may be hosted in a geographically remote provisioned computing environment 106 (i.e., one where it is currently night). Instead of running application 108 in a provisioned computing environment 106 in the current daytime geographic region, broker 104 may dynamically move hosting of application 108 behind the "sun" (i.e., daytime hours) to run where compute resources are not in high demand and are therefore generally cheaper. This may allow the application owner to realize a cost reduction in hosting of application 108.

As described above, when requesting that application 108 be hosted using one or more of provisioned computing environments 106, the application owner may submit one or more application parameters 110, which may define one or more constraints on the hosting of application 108. In other words, these application parameters 110 may provide the mechanism by which application owners inform broker module 104 of their objectives for hosting an application 108. These application parameters 110 may place constraints on the characteristics (e.g., pricing, capabilities, framework structure, performance, and other characteristics) of the vendor-specific provisioned computing environments 106 that may host application 108 at any given time, and may be used by broker module 104 in determining the appropriate provisioned computing environment 106 to host application 108 at a given time. Particular example application parameters 110 may include values for one or more of the following characteristics (each of which are substantially similar to those described above with respect to vendor-specific data 112, but are from the perspective of the application owner's objectives/constraints): central processing unit; volatile memory; non-volatile memory; physical location of computer resources; availability; average latency; security minimums; hosting costs; vendor identity; and any other suitable parameters. Application parameters 110 may be represented by thresholds expressed as percentages or in any other suitable manner, according to particular needs.

Application owner 104 may provide application parameters 110 to broker module 104 in any suitable manner. For example, the application owner may access a portal and/or API generated by broker module 104 to provide application parameters 110 to broker module 104. In certain embodiments, rather than separately define each value of application parameters 110, an application owner may be provided with a number of hosting profiles that specify predefined combinations of values for application parameters 110.

In operation of an example embodiment of system 100, broker module 104 may access application parameters 110 associated with application 108. Broker module 104 may access vendor-specific data 112 for the various vendor-specific provisioned computing environments 106. Broker module 104 may determine from among the various vendor-specific provisioned computing environments 106 and based on application parameters 110 and vendor-specific data 112 for the various provisioned computing environments 106, a first vendor-specific provisioned computing environment 106 (e.g., vendor-specific provisioned computing environment 106a) for hosting application 108. In certain embodiments, broker module 104 may initiate hosting of application 108 using the determined first vendor-specific provisioned computing environment 106. An application 108 being hosted by a provisioned computing environment 106 may mean that the application 108 is running using one or more computing resources of the provisioned computing environment 106. However, the present disclosure contemplates any suitable type of "hosting" of an application 108 by one or more provisioned computing environment 106.

Although determining a first vendor-specific computing environment 106 is primarily described, it should be understood that broker module 104 may determine multiple vendor-specific provisioned computing environments 106 for simultaneously hosting application 108. For example, application parameters 110 may indicate that application 108 should be simultaneously hosted in at least two provisioned computing environments 106 that have different corresponding vendors. This may provide a level of redundancy for the application owner, which may be useful in the event that one of the provisioned computing environments 106 fails or is otherwise down. As a particular example, broker module 104 may determine, based on application parameters 110 and vendor-specific data 112 for provisioned computing environments 106, a second vendor-specific provisioned computing environment 106 (e.g., provisioned computing environment 106b) for hosting application 108. Broker module 104 may initiate hosting of application 108 in both the first and the second vendor-specific provisioned computing environments 106 (e.g., environments 106a and 106b) at substantially the same time such that application 108 is hosted simultaneously using computing resources of both the first and second vendor-specific provisioned computing environments 106.

Once an application 108 is being hosted in a provisioned computing environment 106, broker module 104 may substantially continuously or at any other suitable regular or irregular interval determine whether hosting of application 108 should be moved to one or more other vendor-specific provisioned computing environments 106 (e.g., to another vendor's corresponding provisioned computing environment 106). For example, broker module 104 may monitor or otherwise check for changes in the application parameters 110 for application 108 and/or vendor-specific data 112 for the various vendor-specific provisioned computing environments 106. If changes are detected (or for any other suitable reason), broker module 104 may make a new determination, based on the updated application parameters 110 and/or updated vendor-specific data 112 for provisioned computing environments 106, a second vendor-specific provisioned computing environment 106 (e.g., provisioned computing environment 106b) for hosting application 108. It should be noted that even in light of this updated information, broker module 104 may determine a "second" vendor-specific provisioned computing environment 106 that is the same as the "first" vendor-specific provisioned computing environment 106.

If broker module 104 determines that it is appropriate to move application 108 from the first provisioned computing environment 106 (e.g., environment 106a associated with vendor A) to the second provisioned computing environment 106 (e.g., environment 106b associated with vendor B), then broker module 104 may initiate termination of hosting of application 108 using the first vendor-specific provisioned computing environment 106 (e.g., environment 106a) and initiate hosting of application 108 using the second vendor-specific provisioned computing environment 106 (e.g., environment 106b) such that hosting of application 108 is moved from the first environment 106a to the second environment 106b.

Additional details of an example method that may be performed using system 100 are described below with reference to FIGS. 4A-4B.

Figure 2:
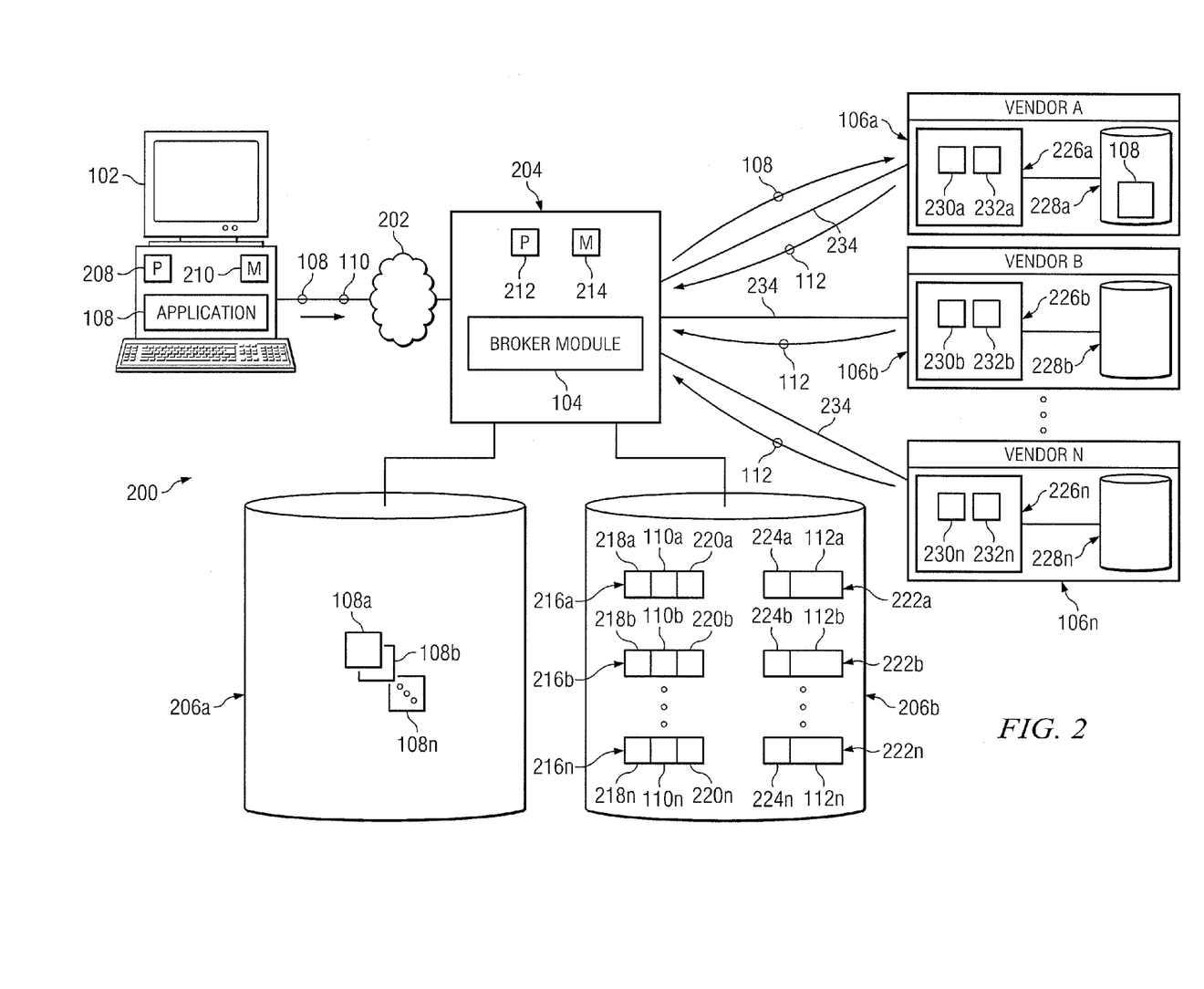
FIG. 2 illustrates a particular example system that is operable to broker for application hosting computing resources of multiple vendor-specific provisioned computing environments, which may be used to implement the example system of FIG. 1 according to certain embodiments of the present disclosure.

FIG. 2 illustrates a particular example system 200 operable to broker for application hosting computing resources of multiple vendor-specific provisioned computing environments, which may be used to implement the example system 100 of FIG. 1 according to certain embodiments of the present disclosure. In the illustrated example, system 100 includes client system 102, a network 202, a processing system 204, storage modules 206, and multiple vendor-specific provisioned computing environments 106. Although system 200 is illustrated and primarily described as including particular components, the present disclosure contemplates system 100 including any suitable components, according to particular needs. System 200 provides one example implementation of the above-described system 100, according to certain embodiments of the present disclosure.

As described above with reference to FIG. 1, client system 102 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, smart phones, table computers, one or more servers, a server pool, one or more processors within these or other devices, or any other suitable processing device. Client system 102 may be a stand-alone computer or may be a part of a larger network of computers associated with an entity.

Client system 102 may include processing unit 208 and memory unit 210. Processing unit 208 may include one or more microprocessors, controllers, or any other suitable computing devices or resources. Processing unit 208 may work, either alone or with other components of system 100, to provide a portion or all of the functionality of system 100 described herein. Memory unit 210 may take the form of volatile or non-volatile memory including, without limitation, magnetic media, optical media, RAM, ROM, removable media, or any other suitable memory component.

Client system 102 may store one or more applications 108 to be hosted using one or more remote vendor-specific provisioned computing environments 106. In general, client system 102 submits application 108 to broker module 104 of processing system 204, along with suitable application parameters 110, to allow broker module 104 to broker for hosting of application 108 the various vendor-specific provisioned computing environments 106. Client system 102 may provide application 108 and application parameters 110 to processing system 204 (e.g., to broker 104) in any suitable manner according to particular needs. For example, using a browser or other suitable network access program, an application owner may use client system 10 to access a portal provided by processing system 204. In certain embodiments, the application owner may use an application programming interface (API) available via the portal to provide application 108 and application parameters 110. The portal and API are described in greater detail below with reference to FIG. 3.

Network 202 facilitates wireless or wireline communication. Network 202 may communicate, for example, IP packets, Frame Relay frames, Asynchronous Transfer Mode (ATM) cells, voice, video, data, and other suitable information between network addresses. Network 202 may include one or more local area networks (LANs), radio access networks (RANs), metropolitan area networks (MANs), wide area networks (WANs), mobile networks (e.g., using WiMax (802.16), WiFi (802.11), 3G, or any other suitable wireless technologies in any suitable combination), all or a portion of the global computer network known as the Internet, and/or any other communication system or systems at one or more locations, any of which may be any suitable combination of wireless and wireline.

Processing system 204 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more servers, a server pool, switch, router, one or more processors within these or other devices, or any other suitable processing device. Processing system 204 may be a standalone computer or may be a part of a larger network of computers associated with an entity.

Processing system 204 may include processing unit 212 and memory unit 214. Processing unit 212 may include one or more microprocessors, controllers, or any other suitable computing devices or resources. Processing unit 212 may work, either alone or with other components of system 100, to provide a portion or all of the functionality of system 100 described herein. Memory unit 214 may take the form of volatile or non-volatile memory including, without limitation, magnetic media, optical media, RAM, ROM, removable media, or any other suitable memory component.

Processing system 204 may include broker module 104, which may be implemented using any suitable combination of hardware, firmware, and software. As described above with reference to FIG. 1, broker module 104 brokers for hosting of an application 108 computing resources of multiple vendor-specific provisioned computing environments 106 according to application parameters 110 provided by the application owner, vendor-specific data 112 for the various vendor-specific provisioned computing environments 106, and any other suitable information.

Processing system 204 may be coupled or otherwise associated with one or more storage modules 206. In the illustrated example two separate storage modules 206a and 206b are shown; however, the present disclosure contemplates storage modules 206a and 206b being combined or split into additional distinct storage modules, according to particular needs. Each storage module 206 may take the form of volatile or non-volatile memory including, without limitation, magnetic media, optical media, RAM, ROM, removable media, or any other suitable memory component. In certain embodiments, a portion of all of storage modules 206 may include a database, such as one or more SQL servers or relational databases. Storage modules 206 may be a part of or distinct from memory unit 214 of processing system 204.

Storage modules 206 may store a variety of information that may be used by broker module 104 to broker the various vendor-specific provisioned computing environments 106 for hosting of application 108. Although storage modules 206 are described as including particular information, storage modules 206 may store any other suitable information. Furthermore, although particular information is described as being stored in storage modules 206, the present description contemplates storing this information in any suitable location, according to particular needs.

Storage module 206a may store applications 108 submitted by application owners (e.g., via client system 102). The stored applications 108 may include the application code in a suitable format. In certain embodiments, applications 108 may be stored as an application container. For example, the application container may be a lightweight modular container, which may be a standard- or an open source-based container. The application container may include an application management interface, which may be an extension or separate module added to the application container to allow broker module 104 to manage, monitor, and control the application 108 associated with the application container.

Storage module 206b may store application parameters 110 and vendor-specific data 112. As described above, application parameters 110 may define constraints for hosting application 108 using one or more vendor-specific provisioned computing environments 106. Application parameters 110 may be identified to broker module 104 by application owners, using client system 102 for example.

In certain embodiments, application parameters 110 may be stored in an application information record 216 that includes an application identifier 218, the application parameters 110, the current vendor parameters 220, and any other suitable information. The application identifier 218 may identify the application 108 corresponding to the application information record 216. The application parameters 110 may specify the values for the application parameters 110 identified by the application owner for hosting of the application 108 using one or more provisioned computing environments 106. The current vendor parameters 220 may identify the one or more provisioned computing environments 106 currently hosting application 108 and the current vendor parameters being used to host application 108. Additionally or alternatively, current vendor parameters 220 may specify monitoring information, such as performance information, associated with the application 108 running in a provisioned computing environment 106, which may be used for reporting purposes.

Storage module 206b may store vendor-specific data 112 for vendor-specific provisioned computing environments 106. As described above, vendor-specific data 112 may include information identifying pricing, capabilities, framework structure, performance, and other characteristics of the various vendor-specific provisioned computing environments 106, generally for both available (but currently unused for purposes of hosting application 108) provisioned computing environments 106 and those one or more provisioned computing environments that currently host application 108 (if any). As described above, vendor-specific data 112 may be identified to broker module 104 by the various vendor-specific provisioned computing environments 106. In certain embodiments, vendor-specific data 112 may be stored in a vendor information record 222 that includes a vendor identifier 224, the vendor-specific data 112, and any other suitable information. The vendor identifier 224 may identify the vendor-specific provisioned computing environment 106 corresponding to the vendor information record 222. The vendor-specific data 112 may specify the values for the vendor-specific data 112 identified to broker module 104 by the various vendor-specific provisioned computing environments 106.

Vendor-specific provisioned computing environments 106 may include any suitable computing resources that may be made available over a network (which may or may not be network 202). Provisioned computing environments 110 may include any suitable combination of hardware, firmware, and software. As just a few examples, provisioned computing environments 106 may each include any suitable combination of applications, power, processors, storage, and any other suitable computing resources that may be made available over a network. As described above, entities accessing computing services provided by the provisioned computing environment may gain access to a suite of elastic IT infrastructure services (e.g., the computing resources of provisioned computing environments 106) as the entity requests those services. Provisioned computing environments 106 may provide a scalable, reliable, and secure distributed computing infrastructure, and may be implemented through a web services API.

In the illustrated example, each provisioned computing environment 106 (e.g., provisioned computing environments 106*a*, 106*b* ... 106*n*) includes a computing system 226 and a storage module 228. Although this particular configuration of provisioned computing environments 106 is illustrated and primarily described, the present disclosure contemplates system 200 including any suitable configuration of provisioned computing environments 106, according to particular needs.

Each computing system 226 may comprise a processing unit 230 and a memory unit 232. Processing unit 230 may include one or more microprocessors, controllers, or any other suitable computing devices or resources. Processing unit 230 may work, either alone or with other components of system 200, to provide a portion or all of the functionality of system 200 described herein. Memory unit 232 may take the form of volatile or non-volatile memory including, without limitation, magnetic media, optical media, RAM, ROM, removable media, or any other suitable memory component. In certain embodiments, a portion of all of memory unit 232 may include a database, such as one or more SQL servers or relational databases. Storage module 228 may be a part of or distinct from memory unit 232 of computing system 226.

Processing system 204 and provisioned computing environments 106 may communicate with one another using one or more links 234. Links 234 facilitate wireless or wireline communication and may communicate, for example, IP packets, Frame Relay frames, ATM cells, voice, video, data, and other suitable information between network addresses. Links 234 may include one or more LANs, RANs, MANs, WANs, mobile networks (e.g., using WiMax (802.16), WiFi (802.11), 3G, or any other suitable wireless technologies in any suitable combination), all or a portion of the global computer network known as the Internet, and/or any other communication system or systems at one or more locations, any of which may be any suitable combination of wireless and wireline. Links 234 may be a part of or separate from network 202.

As described above with reference to FIG. 1, each provisioned computing environment 106 may be associated with a corresponding vendor. Furthermore, each vendor-specific provisioned computing environment 106 may have associated pricing, capabilities, framework structure, performance, and other associated characteristics, any or all of which may be unique to that computing environment and may change over time.

In addition to the example operations described with respect to FIGS. 1, 2, and 3, details of an example method that may be performed using system 200 are described below with reference to FIGS. 4A-4B.

System 200 provides just one example of an environment in which the brokering of vendor-specific provisioned computing environments for hosting an application may be used. The present disclosure contemplates use of the brokering technique in any suitable computing environment. Additionally, although functionality is described as being performed by certain components of system 200, the present disclosure contemplates other components performing that functionality. Furthermore, although certain components are illustrated as being combined or separate, the present disclosure contemplates separating and/or combining components of system 200 in any suitable manner.

Certain embodiments of the present disclosure may provide some, none, or all of the following technical advantages. For example, broker module 104 may allow application owners to control the cost and performance trade-off for hosting of their applications 108 by leveraging multiple vendors of provisioned computing environments 106 for commodity-based provisioned computing resource offerings. As another example, certain embodiments may help application owners manage price, performance, and availability, while keeping costs to the application owner relatively low. As another example, in certain embodiments an open-standards application container with extensions that support communication with broker module 104 may help encourage application owners to use the brokering functionality of embodiments of this disclosure and still allow for rich application experiences.

Certain embodiments may allow the computing resources of provisioned computing environments 106 from the various vendors to be treated as commodities available in a commodities marketplace. As just one example, broker module 104 may facilitate an auction for computing resources of the vendor-specific provisioned computing environments 106. At certain times, some computing resources of a vendor's provisioned computing environment 106 may be unallocated to any particular application owner (or other user). In certain cases, the vendor may allow those unallocated computing resources to be auctioned to application owners (or other users). Thus, in such embodiments, application owners (or other users) may be able to bid on the use of available computing resources. The present disclosure contemplates vendors having the option to set a reserve price for the computing resources, which may provide a minimum price at which those computing resources will be sold regardless of the received bids.

Certain embodiments of the present disclosure allow an application owner to bid not only on the computing resources of a single vendor, but also on the computing resources across a number of different vendors, potentially at the same time. In such an embodiment, broker module 104 may actually run the auction according to parameters specified by both the application owner and the participating vendors. Additionally or alternatively, broker module 104 may interact with a particular vendor-specific computing environment 106 according to an auction operated by that vendor.

In certain embodiments, application parameters 110 provided by the application owner may specify whether broker module 104 should bid on computing resources when such an option is provided by a vendor, as well as set rules or other constraints on the bids (e.g., including providing any suitable minimum or maximum bid amounts or other suitable conditions). Additionally or alternatively, the application owner may use a portal displayed on user system 102 to participate in an interactive bidding process for the computing resources.

Figure 3:
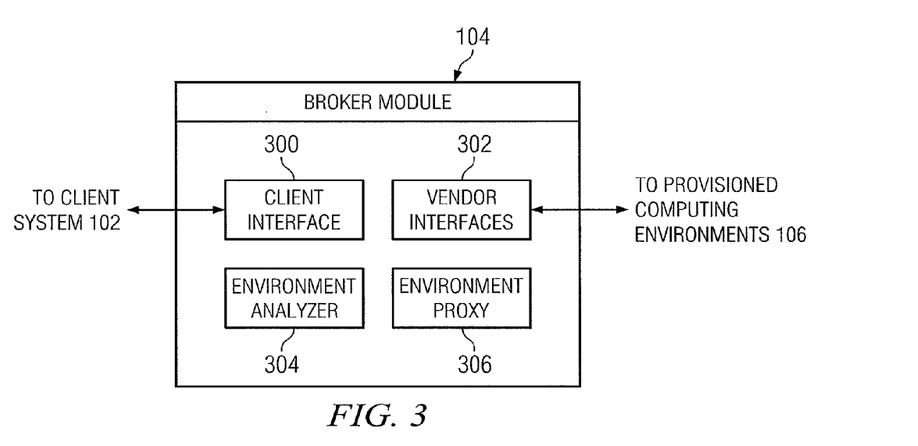
FIG. 3 illustrates example details of the broker module of FIGS. 1 and 2, according to certain embodiments of a present disclosure.

FIG. 3 illustrates example details of broker module 104 of FIGS. 1 and 2, according to certain embodiments of a present disclosure. The example implementation of broker module 104 described with reference to FIG. 3 is provided for example purposes only.

In the illustrated example, broker module 104 includes a client interface 300, vendor interfaces 302, an environment analyzer 304, and an environment proxy 306. Although broker module 104 is illustrated and described as including these components, the present disclosure contemplates broker module 104 including any suitable components according to particular needs. Furthermore, these components may be combined or further divided, as appropriate. The components of broker module 104 may be implemented using any suitable combination of hardware, firmware, and software.

Client interface 300 may facilitate communication between broker module 104 and client system 102. In certain embodiments, client interface 300 provides the mechanism through which an application owner submits (using client system 102) application 108 and application parameters 110 to broker module 104, and by which broker module 104 receives application 108 and application parameters 110 from client system 102. Client interface 300 may provide a mechanism for communicating any suitable reports to client system 102.

Client interface 300 may be implemented in any suitable manner, according to particular needs. As just one example, client interface 300 may be implemented at least in part as a portal through which client system 102 accesses broker module 104 and/or other functionality provided by processing system 204. For example, client system 102 may access the portal using a browser or other suitable network access program. Broker module 104 (e.g., client interface 300) may be operable to generate the portal for receiving from client system 102 application 108 and application parameters 110 associated with application 108.

Client interface 300 (e.g., the portal) may provide the mechanism through which an application owner can manage the life cycle of application 108. For example, client interface 300 may provide the main portal through which application owners can manage their running applications 108, change application parameters 110 (e.g., price/performance values), publish new applications 108, and perform other suitable operations.

In certain embodiments, broker module 104 may be operable to provide one or more reports to the application owner (e.g., via client system 102). For example, broker module 104 (e.g., client interface 300) may communicate using the portal (or other suitable client interface 300) instance information showing the running instances of application 108 in one or more provisioned computing environments 106, usage data or other performance data associated with application 108 and/or the one or more provisioned computing environments 106 in which application 108 is running, cost information associated with hosting application 108 in the one or more provisioned computing environments 106 in which application 108 is running, and/or any other suitable information.

In certain embodiments, a portion or all of client interface 216 may be implemented as one or more APIs. Using APIs may provide a scalable option for publishing application 108 and managing metadata (e.g., application parameters 110) from an application owner's environment (e.g., client system 102).

Vendor interfaces 302 may include the mechanism by which broker module 104 interacts with the different vendor-specific provisioned computing environments 106. Vendor interfaces 302 may provide the primary abstraction API through which broker module 104 interacts with the vendor-specific computing resource environments 106. In certain embodiments, vendor interfaces 302 comprise a set interface with specific abstractions for any vendor. For example, vendor interfaces 302 may be abstracted such that broker module 104 interacts with each vendor-specific provisioned computing environment 106 in a substantially similar manner. In such embodiments, vendor interfaces 302 may use an interpretive shim that handles the actual communication with the vendor-specific provisioned computing environments 106.

Broker module 204 may use vendor interfaces 302 to gather vendor-specific data 112, current vendor parameters 220, and any other suitable information from vendor-specific provisioned computing environments 106. Vendor interfaces 302 may be configured with the appropriate security/login credentials for accessing the various vendor-specific provisioned computing environments 106. Vendor interfaces 302 may also provide broker module 104 with functionality for deploying, starting, running, stopping, and deleting applications 108 using the various vendor-specific provisioned computing environments 106.

Environment analyzer 304 may be operable to evaluate application parameters 110, vendor-specific data 112, and any other suitable information to determine at a given time one or more appropriate vendor-specific provisioned computing environments 106 for hosting an application 108. Environment analyzer 304 may use any suitable techniques such as any suitable modeling techniques to perform this analysis. In operation of certain embodiments, environment analyzer 304 may access application parameters 110, vendor-specific data 112, and any other suitable information, and may analyze this infoimation to determine which one or more vendor-specific provisioned computing environments 106 should be used to host application 108. As described above, environment analyzer 304 may operate on a substantially continuous basis or at any other regular or irregular interval to reevaluate whether hosting of application 108 should be moved among provisioned computing environments 106 in a way that is best for the application owner (e.g., per the application parameters 110 specified by the application owner).

Environment proxy 306 may receive and route requests for use of applications 108 that broker module 104 has instantiated in one or more provisioned computing environments 106. For example, once broker module 104 has initiated hosting of application 108 in one or more provisioned computing environments 106, proxy 306 may receive actual user requests for application 108 and route those request to the current hosting location (at a provisioned computing environment 106) of application 108 for processing. Thus, rather than contacting the actual location of the application with user requests (i.e., at the provisioned computing environment 106), user requests are routed through broker module 104 (and, in particular, environment proxy 306). Environment proxy 306 may be updated dynamically as application 108 is moved among provisioned computing environments 106.

To the extent an application 108 is hosted simultaneously in multiple provisioned computing environments 106, environment proxy 306 may provide certain load balancing or other functionality for determining to which provisioned computing environment 106 user requests for application 108 should be routed. For example, environment proxy 108 may distribute, according to one or more load balancing policies, user requests for application 108 across the simultaneously-hosted instances of application 108 in the multiple provisioned computing environments 106. Handling this load balancing functionality at broker module 104 may reduce or eliminate the handling of such load balancing and/or other routing functionality from an application owner (e.g., client system 102) and/or application 108.

In operation of an example embodiment of system 200, environment proxy 306 may receive a first user request for use of application 108. The first user request may be received at a time during which application 108 is hosted using a first vendor-specific provisioned computing environment 106 (e.g., provisioned computing environment 106a). Environment proxy 306 may route the first user request for use of application 108 to the first vendor-specific provisioned computing environment (e.g., provisioned computing environment 106a) for processing. Environment proxy 306 may receive a second user request for use of application 108. The second user request may be received at a time during which application 108 is hosted using a second vendor-specific provisioned computing environment (e.g., provisioned computing environment 106b). Environment proxy 306 may route the second user request for use of application 108 to the second vendor-specific provisioned computing environment (e.g., provisioned computing environment 106b) for processing.

Figure 4A:
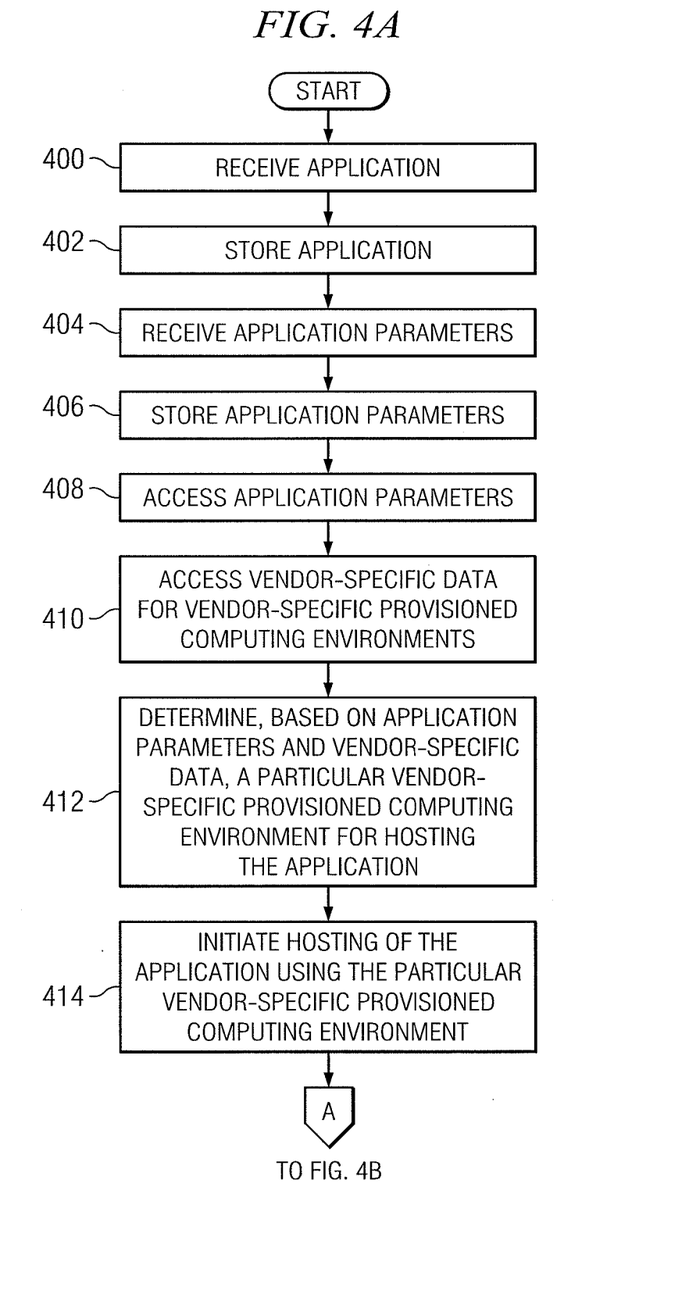
FIGS. 4A-4B illustrate an example method of brokering for application hosting computing resources of multiple vendor-specific provisioned computing environments, which may be performed by the example systems of FIGS. 1 and 2 according to certain embodiments of a present disclosure.
Figure 4B:
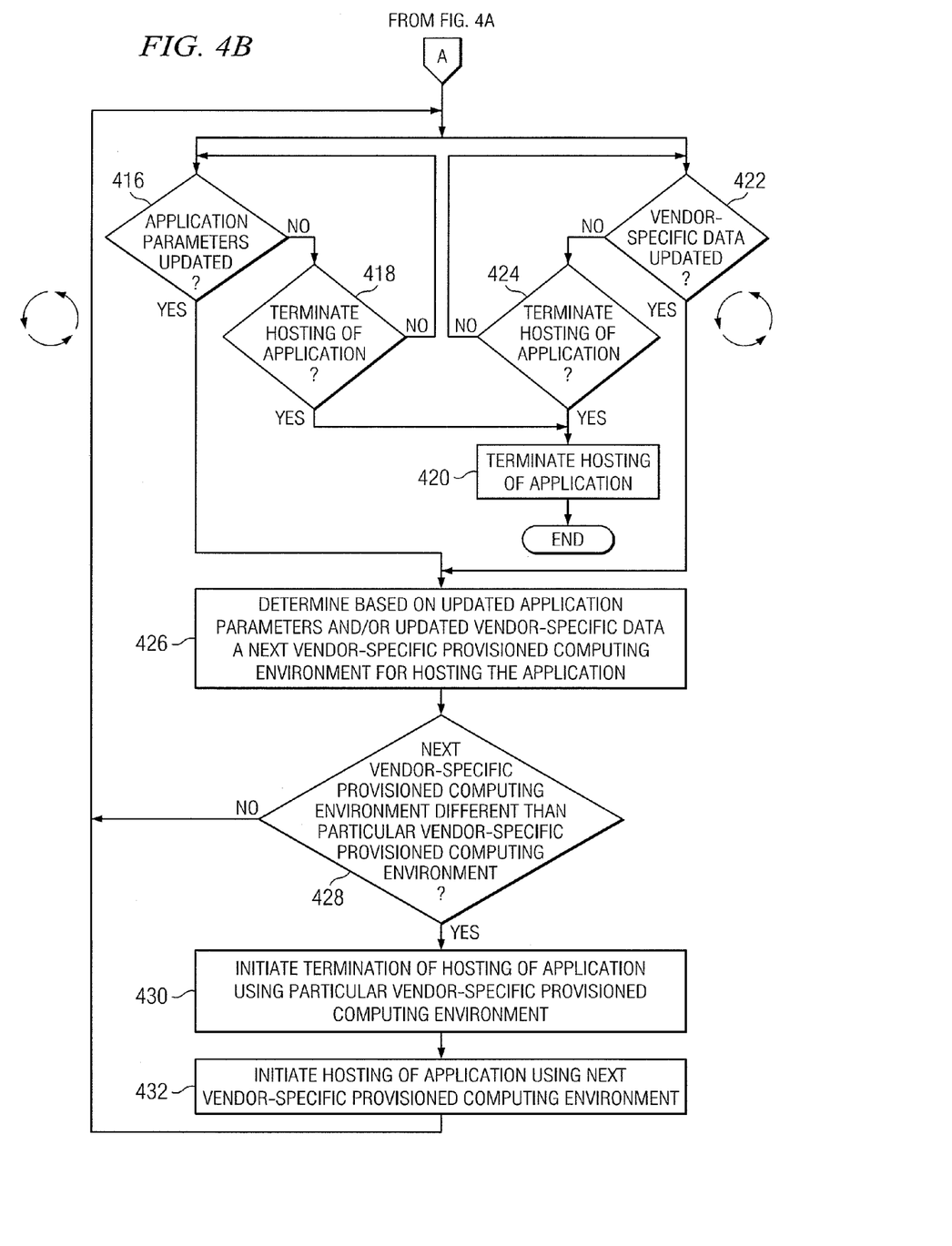

FIGS. 4A-4B illustrate an example method of brokering for application hosting computing resources of multiple vendor-specific provisioned computing environments 106, which may be performed by the example systems 100 and 200 of FIGS. 1 and 2, respectively, according to certain embodiments of a present disclosure. The method may be implemented in any suitable combination of software, firmware, and hardware. Although particular components may be identified as performing particular steps, the present disclosure contemplates any suitable components performing the steps according to particular needs.

At step 400, broker module 104 may receive an application 108 to be hosted using one or more vendor-specific provisioned computing environments 106. For example, broker module 104 (e.g., using client interface 300) may receive application 108 from an application owner via client system 102. In certain embodiments, the application may be submitted by the application owner in an application container, as described above. At step 402, broker module 104 may store application 108, in storage module 206a for example.

At step 404, broker module 104 may receive application parameters 110 associated with 108. For example, broker module 104 (e.g., using client interface 300) may receive application parameters 110 for application 108 from an application owner via client system 102. As described above, application parameters 110 may define constraints for hosting application 108 using one or more of vendor-specific provisioned computing environments 106. At step 406, broker module 104 may store application parameters 110, in storage module 206b for example.

At step 408, broker module 104 may access application parameters 110 for application 108. For example, broker module 104 (e.g., environment analyzer 304) may access application parameters 110 stored in storage module 206b.

At step 410, broker module 104 may access vendor-specific data 112 for vendor-specific provisioned computing environments 106. For example, broker module 104 (e.g., environment analyzer 304) may access vendor-specific data 112 for vendor-specific provisioned computing environments 106 stored in storage module 206b. Vendor-specific data 112 may be the last vendor-specific data 112 about vendor-specific provisioned computing environments 106 that was acquired by broker module 104 using vendor interfaces 302.

At step 412, based on application parameters 110 and vendor-specific data 112, broker module 104 (e.g., environment analyzer 304) may determine from among the plurality of vendor-specific provisioned computing environments 106a particular vendor-specific provisioned computing environment 106 (e.g., environment 106a) for hosting application 108. In certain embodiments, broker module 104 determines, from among vendor-specific provisioned computing environments 106, the particular vendor-specific provisioned computing environment 106 for hosting application 108 by comparing application parameters 110 to vendor-specific data 112 for the vendor-specific provisioned computing environments 106 to determine one or more of the vendor-specific provisioned computing environments 106 capable of satisfying application parameters 110, and by determining, from among the determined one or more of the vendor-specific provisioned computing environments 106 capable of satisfying application parameters 110, that the particular vendor-specific provisioned computing environment 106 is capable of best satisfying application parameters 110.

In certain embodiments, an application owner may be able to override the determination made by broker module 104 as to which vendor-specific provisioned computing environment 106 should host application 108. For example, prior to or after broker module 104 initiates hosting of application 104 using the determined particular provisioned computing environment 106, broker module may communicate to client system 102 (e.g., via client interface 300, such as the portal) a notification indicating the determined particular vendor-specific computing resource environment 106 in which application 108 will be hosted. If the application owner does not approve of the determined particular provisioned computing environment 106, broker module 104 may receive an indication from client system 102 (e.g., the owner of application 108) that application 108 should not be hosted using the particular vendor-specific provisioned computing environment 106. Broker module 104 may then communicate another notification to client system 102 indicating and alternate provisioned computing environment 106 in which the application will be hosted. This process may continue until a satisfactory vendor-specific provisioned computing environment 106 is determined.

At step 414, broker module 104 may initiate hosting of application 108 using the particular vendor-specific provisioned computing environment 106 determined at step 412. In certain embodiments, broker module 104 may initiate hosting of application 108 using the particular vendor-specific provisioned computing environment 106 by requesting of the particular vendor-specific provisioned computing environment 106 that a subset of the computing resources of the particular vendor-specific provisioned computing environment 106 be dedicated for use in hosting application 108. In other words, as described above, provisioned computing environments 106 may include computing resources that may be provisioned for use over a network by a variety of entities. As part of initiating hosting of application 108 using the particular provisioned computing environment 106, broker 104 may request that a portion of the computing resources available to be provisioned by the particular provisioned computing environment 106 be set aside for use in hosting application 108.

In certain embodiments, broker module 104 may use deploy (or invoke an already-deployed instance of) a machine image to the determined provisioned computing environment techniques. This machine image may be deployed at the time of instantiation or may preinstalled at the different provisioned computing environments 106. A machine image generally includes a packaged environment that includes all the appropriate bits to set up and boot an instance in a provisioned computing environment 106. Broker module 104 may provide the instance with application 108, so that application 108 may be hosted in the determined provisioned computing environment 106.

At steps 416-432, broker module 104 may substantially continuously or at any other suitable regular or irregular interval monitor for changes in application parameters 110 and/or vendor-specific data 112 and determine whether to move hosting of application 108 to another vendor-specific provisioned computing environment 106. In certain embodiments, this may allow broker module 104 to dynamically move hosting of a running application 108 to the one or more computing environments 106 that best meet the constraints identified in application parameters 110.

At step 416, broker module 104 may determine whether application parameters 110 have been updated. For example, broker module 104 may detect whether an application owner has submitted changes to applications parameters 110 for application 108 using client system 102 (e.g., via client interface 300. Although termed a "determination," it should be understood that in certain embodiments broker module 104 may not make an explicit determination of whether or not application parameters 110 have been updated, but may simply detect receipt of updated application parameters 110 (e.g., from client system 102 via client interface 300).

If broker module 104 determines at step 416 that it has not received updated application parameters 110, then at step 418, broker module 104 may determine whether hosting of application 108 should be terminated. For example, broker module 104 may detect whether an application owner submitted a request to broker module 104 (e.g., using client system 102 and via client interface 300) to terminate hosting of application 108 using provisioned computing environments 106. Although termed a "determination," it should be understood that in certain embodiments broker module 104 may not make an explicit determination of whether or not termination has been requested, but may simply detect receipt of a request to terminate hosting of application 108 (e.g., from client system 102 via client interface 300).

If broker module 104 determines at step 418 that hosting of application 108 should be terminated, then at step 420 broker module 104 may initiate termination of hosting of application 108. For example, broker module 104 may access application information record 216 for application 108, determine from the current vendor parameters 220 the one or more provisioned computing environments 106 currently hosting application 108 (in this example, the particular provisioned computing environment 106), and initiate termination (via the appropriate vendor interface 302) of hosting of application 214 by the particular provisioned computing environment 106. If broker module 104 determines at step 418 that hosting of application 108 should not be terminated, then broker module 104 may return to step 416 to continue monitoring for updates to application parameters 110.

Returning to step 416, if broker module 104 determines at step 416 that it has received updated application parameters 110, then the method may proceed to step 426, described below.

At step 422, broker module 104 may determine whether vendor-specific data 112 has been updated. For example, broker module 104 may detect whether new vendor-specific data 112 has been received from one or more vendor-specific computing environments 106 via one or more vendor interfaces 302. As another example, broker module 104 may have predefined knowledge of certain changes in certain vendors-specific data 112 upon occurrence of certain events and may detect an "update" on the occurrence of such events. For example, stored vendor-specific data 112 for a particular vendor's provisioned computing environment 106 may indicate a predefined pricing schedule for use of computing resources of the particular vendor's provisioned computing environment 106, indicating that prices change according to the time of day. In such a scenario, broker module 104 may detect an update at that time of day, regardless of whether new vendor-specific data 112 has been received from the vendor. Although termed a "determination," it should be understood that in certain embodiments broker module 104 may not make an explicit determination of whether or not vendor-specific data 112 has been updated, but may simply detect receipt of updated vendor-specific data 112 (e.g., from client system 102 via client interface 300) or the occurrence of some other event tied to an update of vendor-specific data 112.

If broker module 104 determines at step 422 that it has not received updated vendor-specific data 112, then at step 424, broker module 104 may determine whether hosting of application 108 should be terminated. For example, broker module 104 may detect whether an application owner submitted a request to broker module 104 (e.g., using client system 102 and via client interface 300) to terminate hosting of application 108 using provisioned computing environments 106. Although termed a "determination," it should be understood that in certain embodiments broker module 104 may not make an explicit determination of whether or not termination has been requested, but may simply detect receipt of a request to terminate hosting of application 108 (e.g., from client system 102 via client interface 300).

If broker module 104 determines at step 424 that hosting of application 108 should be terminated, then broker module 104 may proceed to the above-described step 420 to terminate hosting of application 108. If broker module 104 determines at step 424 that hosting of application 108 should not be terminated, then broker module 104 may return to step 422 to continue monitoring for updates to vendor-specific data 112.

Returning to step 422, if broker module 104 determines at step 422 that it has received updated vendor-specific data 112, then the method may proceed to step 426.

At step 426, broker module 104 may determine, based on updated application parameters 110 and/or updated vendor-specific data 112, a next vendor-specific provisioned computing environment 106 (e.g., environment 106*b*) for hosting application 108. The determined next vendor-specific provisioned computing environment 106 for hosting application 108 may be the same as the particular vendor-specific provisioned computing environment 106 currently for hosting application 108, an additional vendor-specific provisioned computing environment 106 for hosting application 108, a another of the plurality of vendor-specific provisioned computing environment 106 for hosting application 108, or any other suitable vendor-specific provisioned computing environment 106 for which broker module may have access to vendor-specific data 112. Broker module 104 (e.g., using environment analyzer 304) may make this determination in a substantially similar manner to the above-described determination of step 412.

At step 428, broker module 104 may determine whether the next vendor-specific provisioned computing environment 106 for hosting application 108 (determined at step 426) is different than the particular vendor-specific provisioned computing environment 106 that is currently hosting application 108. If broker module 104 determines at step 428 that the next vendor-specific provisioned computing environment 106 for hosting application 108 (determined at step 426) is the same as the particular vendor-specific provisioned computing environment 106 that is currently hosting application 108, then broker module 104 may return to steps 416 and 422 to continue monitoring for updates to application parameters 110 and/or vendor-specific data 112.

If broker module 104 determines at step 428 that the next vendor-specific provisioned computing environment 106 for hosting application 108 (determined at step 426) is different than the particular vendor-specific provisioned computing environment 106 that is currently hosting application 108, then at step 430 broker module 104 may initiate termination of hosting of application 108 in the particular vendor-specific provisioned computing environment 106 currently hosting application 108. For example, broker module 104 may access application information record 216 for application 108, determine from the current vendor parameters 220 the one or more provisioned computing environments 106 currently hosting application 108 (in this example, the particular provisioned computing environment 106), and initiate termination (via the appropriate vendor interface 302) of hosting of application 214 by the particular provisioned computing environment 106. At step 432, broker module 104 may initiate hosting of application 108 using the next vendor-specific provisioned computing environment 106 determined at step 426. Broker module 104 may initiate hosting of application 108 using the next vendor-specific provisioned computing environment 106 in a manner substantially similar to that described above with reference to step 414.

In certain embodiments, broker module 104 may perform steps 430 and 432 in such a manner that the transfer of hosting of application 108 from the particular vendor-specific provisioned computing environment 106 currently hosting application 108 to the next vendor-specific provisioned computing environment 106 to host application 108 is substantially seamless and unnoticeable by users of application 108.

Broker module may return to steps 416 and 422 to continue monitoring for updates to application parameters 110 and/or vendor-specific data 112.

Although processing of a single application 108 is primarily described, the present disclosure contemplates broker module 104 storing and brokering vendor-specific computing environments 106 on behalf of multiple applications 108 associated with one or more application owners. Furthermore, as described above, broker module 104 may determine (e.g., at step 412 and/or 426) that any suitable number of vendor-specific computing environments 106 should simultaneously host application 108. Furthermore, in response to evaluating application parameters 110 and vendor-specific data 112, rather than determining that application 108 continue to be hosted in its current environment 106, be started in a new environment 106, or be moved from one environment 106 to a new environment 106, broker module 104 (e.g., environment analyzer 304) may determine that no environment 106 is appropriate for hosting application 108 based on the application owner's current application parameters 110 and/or the vendor-specific data 112.

Figure 5:
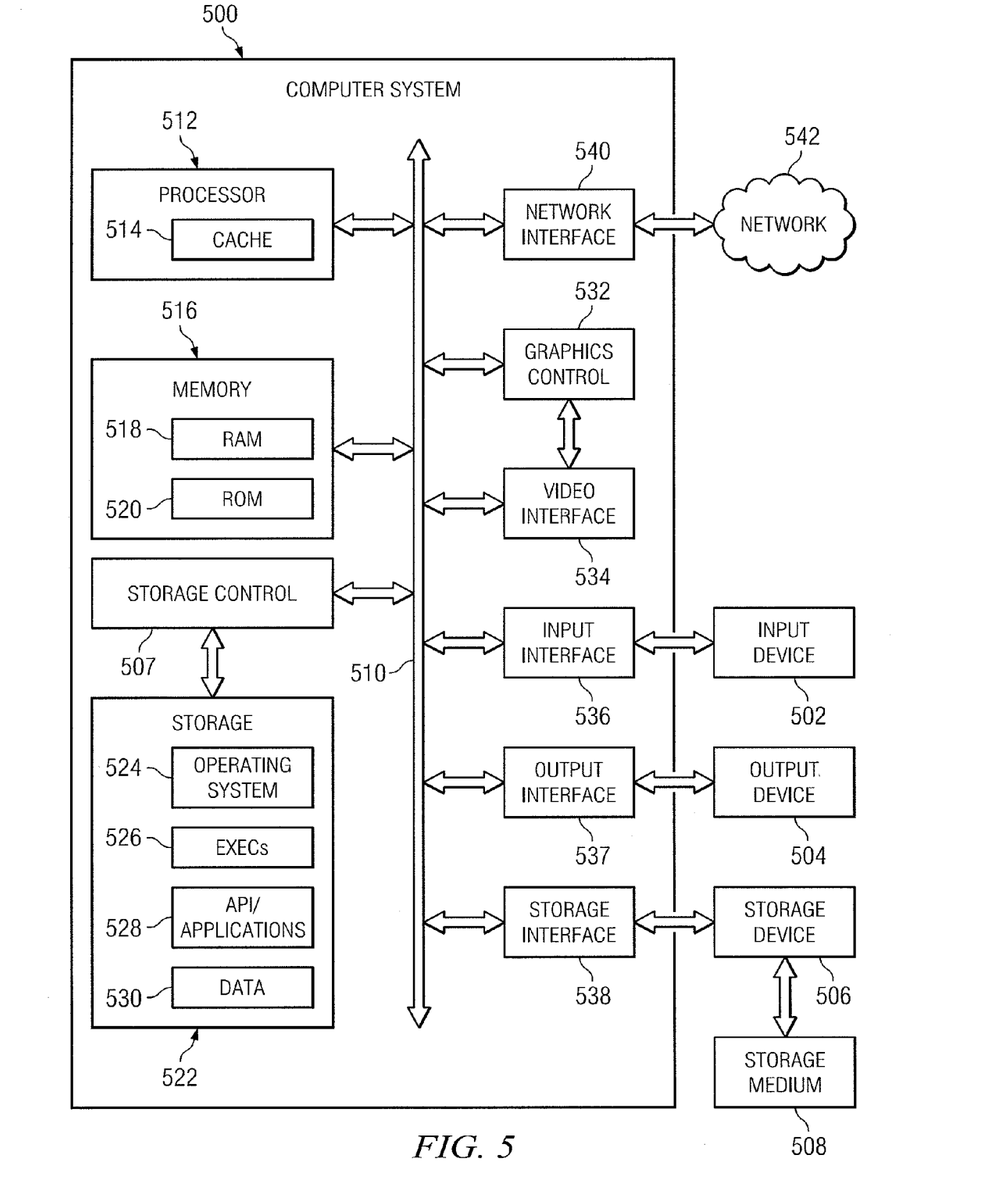
FIG. 5 illustrates an example computer system that may be used for one or more portions of the example system of FIGS. 1 and 2, according to certain embodiments of the present disclosure.

FIG. 5 illustrates an example computer system 500 that may be used for one or more portions of example systems 100 and 200 of FIGS. 1 and 2, respectively, according to certain embodiments of the present disclosure. Although the present disclosure describes and illustrates a particular computer system 500 having particular components in a particular configuration, the present disclosure contemplates any suitable computer system having any suitable components in any suitable configuration. Moreover, computer system 500 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. Portions or all of client system 102, processing system 204, storage module 108, and computing resources 110 may be implemented using all of the components, or any appropriate combination of the components, of computer system 500 described below.

Computer system 500 may have one or more input devices 502 (which may include a keypad, keyboard, mouse, stylus, or other input devices), one or more output devices 504 (which may include one or more displays, one or more speakers, one or more printers, or other output devices), one or more storage devices 506, and one or more storage media 508. An input device 502 may be external or internal to computer system 500. An output device 504 may be external or internal to computer system 500. A storage device 506 may be external or internal to computer system 500. A storage medium 508 may be external or internal to computer system 500.

System bus 510 couples subsystems of computer system 500 to each other. Herein, reference to a bus encompasses one or more digital signal lines serving a common function. The present disclosure contemplates any suitable system bus 510 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 500 includes one or more processors 512 (or central processing units (CPUs)). A processor 512 may contain a cache 514 for temporary local storage of instructions, data, or computer addresses. Processors 512 are coupled to one or more storage devices, including memory 516. Memory 516 may include RAM 518 and ROM 520. Data and instructions may transfer bi-directionally between processors 512 and RAM 518. Data and instructions may transfer uni-directionally to processors 512 from ROM 520. RAM 518 and ROM 520 may include any suitable computer-readable storage media.

Computer system 500 includes fixed storage 522 coupled bi-directionally to processors 512. Fixed storage 522 may be coupled to processors 512 via storage control unit 507. Fixed storage 522 may provide additional data storage capacity and may include any suitable computer-readable storage media. Fixed storage 522 may store an operating system (OS) 524, one or more executables (EXECs) 526, one or more applications or programs 528, data 530 and the like. Fixed storage 522 is typically a secondary storage medium (such as a hard disk) that is slower than primary storage. In appropriate cases, the information stored by fixed storage 522 may be incorporated as virtual memory into memory 516. In certain embodiments, fixed storage 522 may include network resources, such as one or more storage area networks (SAN) or network-attached storage (NAS).

Processors 512 may be coupled to a variety of interfaces, such as, for example, graphics control 532, video interface 534, input interface 536, output interface 537, and storage interface 538, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 540 may couple processors 512 to another computer system or to network 542. Network interface 540 may include wired, wireless, or any combination of wired and wireless components. Such components may include wired network cards, wireless network cards, radios, antennas, cables, or any other appropriate components. With network interface 540, processors 512 may receive or send information from or to network 542 in the course of performing steps of certain embodiments. Certain embodiments may execute solely on processors 512. Certain embodiments may execute on processors 512 and on one or more remote processors operating together.

In a network environment, where computer system 500 is connected to network 542, computer system 500 may communicate with other devices connected to network 542. Computer system 500 may communicate with network 542 via network interface 540. For example, computer system 500 may receive information (such as a request or a response from another device) from network 542 in the form of one or more incoming packets at network interface 540 and memory 516 may store the incoming packets for subsequent processing. Computer system 500 may send information (such as a request or a response to another device) to network 542 in the form of one or more outgoing packets from network interface 540, which memory 516 may store prior to being sent. Processors 512 may access an incoming or outgoing packet in memory 516 to process it, according to particular needs.

Certain embodiments involve one or more computer-storage products that include one or more tangible, computer-readable storage media that embody software for performing one or more steps of one or more processes described or illustrated herein. In certain embodiments, one or more portions of the media, the software, or both may be designed and manufactured specifically to perform one or more steps of one or more processes described or illustrated herein. Additionally or alternatively, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In certain embodiments, software may be machine code which a compiler may generate or one or more files containing higher-level code which a computer may execute using an interpreter.

As an example and not by way of limitation, memory 516 may include one or more tangible, computer-readable storage media embodying software and computer system 500 may provide particular functionality described or illustrated herein as a result of processors 512 executing the software. Memory 516 may store and processors 512 may execute the software. Memory 516 may read the software from the computer-readable storage media in mass storage device 516 embodying the software or from one or more other sources via network interface 540. When executing the software, processors 512 may perform one or more steps of one or more processes described or illustrated herein, which may include defining one or more data structures for storage in memory 516 and modifying one or more of the data structures as directed by one or more portions the software, according to particular needs.

In certain embodiments, the described processing and memory elements (such as processors 512 and memory 516) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 500 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A system, comprising:
   one or more memory units; and
   one or more processing units associated with a broker for computing resources of a plurality of provisioned computing environments available over a computer network from a plurality of computing resources vendors, the one or more processing units operable to:
   access application parameters associated with an application, the application parameters defining constraints specified by an owner of the application for hosting the application using one or more of the plurality of provisioned computing environments available over the computer network from the plurality of computing resources vendors, each vendor associated with a corresponding vendor-specific provisioned computing environment comprising a plurality of computing resources available to be provisioned for use by a plurality of entities distinct from the vendors;
   access vendor-specific data for the plurality of vendor-specific provisioned computing environments, the vendor-specific data comprising information relating to characteristics of the plurality of vendor-specific provisioned computing environments;

determine from among the plurality of vendor-specific provisioned computing environments and based on the application parameters and the vendor-specific data for the plurality of provisioned computing environments, a first vendor-specific provisioned computing environment for hosting the application;

initiate hosting of the application using the determined first vendor-specific provisioned computing environment;

monitor the application parameters for updates indicating updated application parameters, the updated application parameters comprising changes to the application parameters defining the constraints specified by the owner of the application for hosting the application using the one or more of the plurality of provisioned computing environments available over the computer network from the plurality of computing resources vendors;

determine, from among the plurality of vendor-specific provisioned computing environments and based on the updated application parameters and the vendor-specific data for the plurality of provisioned computing environments, a second vendor-specific provisioned computing environment for hosting the application, the second vendor-specific provisioned computing environment provided by a second vendor that is different than the first vendor; and initiate hosting of the application using the determined second vendor-specific provisioned computing environment.

2. The system of claim 1, wherein:

the broker is distinct from the vendor associated with the first vendor-specific provisioned computing environment; and the one or more processing units associated with the broker are further operable to:
receive a first user request for use of the application, the first user request received at a time during which the application is hosted using the first vendor-specific provisioned computing environment;
route the first user request for use of the application to the first vendor-specific provisioned computing environment for processing;
receive a second user request for use of the application, the second user request received at a time during which the application is hosted using the second vendor-specific provisioned computing environment; and
route the second user request for use of the application to the second vendor-specific provisioned computing environment for processing.

3. A computer-implemented method, comprising:

accessing, using one or more processing units of a broker module, application parameters associated with an application, the application parameters defining constraints specified by an owner of the application for hosting the application using one or more of a plurality of provisioned computing environments available over a computer network from a plurality of computing resources vendors, each vendor associated with a corresponding vendor-specific provisioned computing environment comprising a plurality of computing resources available to be provisioned for use by a plurality of entities distinct from the vendors;

accessing, using the one or more processing units of the broker module, vendor-specific data for the plurality of vendor-specific provisioned computing environments;

determining, using the one or more processing units of the broker module, from among the plurality of vendor-specific provisioned computing environments and based on the application parameters and the vendor-specific data for the plurality of provisioned computing environments, a first vendor-specific provisioned computing environments for hosting the application;

monitoring, using the one or more processing units of the broker module, the application parameters for updates indicating updated application parameters, the updated application parameters comprising changes to the application parameters defining the constraints specified by the owner of the application for hosting the application using the one or more of the plurality of provisioned computing environments available over the computer network from the plurality of computing resources vendors; and determining, using the one or more processing units of the broker module, from among the plurality of vendor-specific provisioned computing environments and based on the updated application parameters and the vendor-specific data for the plurality of provisioned computing environments, a second vendor-specific provisioned computing environment for hosting the application, the second vendor-specific provisioned computing environment provided by a second vendor that is different than the first vendor.

4. The method of claim 3, comprising initiating hosting of the application in both the first and the second vendor-specific provisioned computing environments at the same time such that the application is hosted simultaneously using computing resources of both the first and second vendor-specific provisioned computing environments.

5. The method of claim 3, comprising:

initiating, prior to determining the second vendor-specific provisioned computing environment for hosting the application, hosting of the application using the determined first vendor-specific provisioned computing environment;

terminating, subsequent to determining the second vendor-specific provisioned computing environment for hosting the application, hosting of the application using the first vendor-specific provisioned computing environment; and initiating hosting of the application using the second vendor-specific provisioned computing environment such that hosting of the application is moved from the first vendor-specific provisioned computing environment to the second vendor-specific provisioned computing environment.

6. The method of claim 5, wherein:

the one or more processing units are associated with a first entity distinct from the vendor associated with the first vendor-specific provisioned computing environment; and the method further comprises:
receiving, using the one or more processing units, a first user request for use of the application, the first user request received at a time during which the application is hosted using the first vendor-specific provisioned computing environment;
routing, using the one or more processing units, the first user request for use of the application to the first vendor-specific provisioned computing environment for processing;
receiving, using the one or more processing units, a second user request for use of the application, the second user request received at a time during which the application is hosted using the second vendor-specific provisioned computing environment; and routing, using the one or more processing units, the second user request for use of the application to the second vendor-specific provisioned computing environment for processing.

7. The method of claim 3, wherein the application parameters identify acceptable values for one or more of the following characteristics:
   central processing unit;
   volatile memory;
   non-volatile memory;
   physical location of computing resources;
   availability;
   security minimums;
   hosting costs; and
   vendor identity.

8. The method of claim 3, wherein the vendor-specific data for the plurality of vendor-specific provisioned computing environments comprises values for one or more of the following characteristics of the plurality of vendor-specific provisioned computing environments:
   central processing units;
   volatile memory;
   non-volatile memory;
   physical location of computing resources;
   availability;
   security;
   hosting costs; and
   vendor identity.

9. The method of claim 3, comprising polling the plurality of vendor-specific provisioned computing environments for the vendor-specific data.

10. The method of claim 3, wherein determining, from among the plurality of vendor-specific provisioned computing environments and based on the application parameters and the vendor-specific data, a first vendor-specific provisioned computing environment for hosting the application, comprises:
   comparing the application parameters to the vendor-specific data to determine one or more of the plurality of vendor-specific provisioned computing environments are capable of satisfying the application parameters; and
   determining, from among the determined one or more of the plurality of vendor-specific provisioned computing environments capable of satisfying the application parameters, that the first vendor-specific provisioned computing environment is capable of satisfying the application parameters.

11. The method of claim 3, further comprising initiating hosting of the application using the determined first vendor-specific provisioned computing environment.

12. The method of claim 11, wherein initiating hosting of the application using the first vendor-specific provisioned computing environment comprises requesting of the first vendor-specific provisioned computing environment that a subset of the computing resources of the first vendor-specific provisioned computing environment be dedicated for use in hosting the application.

13. The method of claim 3, further comprising:
   communicating a first notification to an owner of the application indicating the determined first vendor-specific provisioned computing environment in which the application will be hosted;
   receiving an indication from the owner of the application that the application should not be hosted using the first vendor-specific provisioned computing environment; and
   communicating a second notification to the owner of the application of a second vendor-specific provisioned computing environment in which the application will be hosted.

14. The method of claim 3, wherein the first entity is distinct from at least one of the plurality of vendors.

15. A non-transitory computer-readable medium comprising logic, the logic when executed by one or more processing units operable to perform operations comprising:
   generating a portal for receiving an application and application parameters associated with the application, the application parameters defining constraints specified by an owner of the application for hosting the application using one or more of a plurality of provisioned computing environments available over a computer network from a plurality of computing resources vendors, each vendor associated with a corresponding vendor-specific provisioned computing environment comprising a plurality of computing resources available to be provisioned for use by a plurality of entities distinct from the vendors;
   receiving the application and application parameters using the portal;
   accessing the received application parameters associated with the application;
   accessing vendor-specific data for the plurality of vendor-specific provisioned computing environments;
   determining, from among the plurality of vendor-specific provisioned computing environments and based on the application parameters and the vendor-specific data for the plurality of provisioned computing environments, a first vendor-specific provisioned computing environment for hosting the application;
   monitoring the application parameters for updates indicating updated application parameters, the updated application parameters comprising changes to the application parameters defining the constraints specified by the owner of the application for hosting the application using the one or more of the plurality of provisioned computing environments available over the computer network from the plurality of computing resources vendors; and
   determining, from among the plurality of vendor-specific provisioned computing environments and based on the updated application parameters and the vendor-specific data for the plurality of provisioned computing environments, a second vendor-specific provisioned computing environment for hosting the application, the second vendor-specific provisioned computing environment provided by a second vendor that is different than the first vendor.

16. The non-transitory computer-readable medium of claim 15, wherein the portal further comprises an application programming interface (API) adapted for use in receiving the application and application parameters.

17. The non-transitory computer-readable medium of claim 15, wherein the operations further comprise:
   initiating hosting of the application using the determined first vendor-specific provisioned computing environment; and
   communicating, using the portal, to an owner of the application data indicating one or more of the following:

performance of the application being hosted in the first vendor-specific computing environment; and cost information associated with hosting the application in the first vendor-specific computing environment.

18. The non-transitory computer-readable medium of claim 15, wherein the operations further comprise determining, based on the application parameters and the vendor-specific data for the plurality of provisioned computing environments, a second vendor-specific provisioned computing environment for hosting the application.

19. The non-transitory computer-readable medium of claim 18, wherein the operations comprise initiating hosting of the application in both the first and the second vendor-specific provisioned computing environments at the same time such that the application is hosted simultaneously using computing resources of both the first and second vendor-specific provisioned computing environments.

20. The non-transitory computer-readable medium of claim 18, wherein the operations further comprise:

initiating, prior to determining the second vendor-specific provisioned computing environment for hosting the application, hosting of the application using the determined first vendor-specific provisioned computing environment;

terminating, subsequent to determining the second vendor-specific provisioned computing environment for hosting the application, hosting of the application using the first vendor-specific provisioned computing environment; and initiating hosting of the application using the second vendor-specific provisioned computing environment such that hosting of the application is moved from the first vendor-specific provisioned computing environment to the second vendor-specific provisioned computing environment.

21. The non-transitory computer-readable medium of claim 15, wherein the operations further comprise polling the plurality of vendor-specific provisioned computing environments for the vendor-specific data.

22. The non-transitory computer-readable medium of claim 15, wherein determining, from among the plurality of vendor-specific provisioned computing environments and based on the application parameters and the vendor-specific data, a first vendor-specific provisioned computing environment for hosting the application, comprises:

comparing the application parameters to the vendor-specific data to determine one or more of the plurality of vendor-specific provisioned computing environments are capable of satisfying the application parameters; and determining, from among the determined one or more of the plurality of vendor-specific provisioned computing environments capable of satisfying the application parameters, that the first vendor-specific provisioned computing environment is capable of satisfying the application parameters.

23. The non-transitory computer-readable medium of claim 15, wherein the operations further comprise initiating hosting of the application using the determined first vendor-specific provisioned computing environment.

24. The non-transitory computer-readable medium of claim 15, wherein the operations further comprise:

communicating a first notification to an owner of the application indicating the determined first vendor-specific provisioned computing environment in which the application will be hosted;

receiving an indication from the owner of the application that the application should not be hosted using the first vendor-specific provisioned computing environment; and communicating a second notification to the owner of the application of a second vendor-specific provisioned computing environment in which the application will be hosted.

* * * * *